United States Patent Office 2,757,141
Patented July 31, 1956

2,757,141

DIELECTRIC MATERIALS

Sidney D. Ross and William M. Allison, Williamstown, Mass., assignors to Sprague Electric Company, North Adams, Mass., a corporation of Massachusetts No Drawing. Application December 31, 1952, Serial No. 329,084

2 Claims. (Cl. 252—63.7)

This invention relates to improved electrical devices and more particularly it refers to electrical devices containing dielectric materials capable of operation for extended periods and elevated temperatures without failure. This application is a continuation-in-part of U. S. patent application Serial No. 276,465, filed March 13, 1952.

The use of inhibitors in capacitor impregnants, as a typical example, is not new. Materials such as anthraquinone have been suggested and have found at least limited use for chlorinated naphthalene wax.

While inhibitors of the anthraquinone type do contribute to improved results when employed in moderate percentages, they are in no way completely successful. When used in amounts insufficient to deleteriously affect the primary dielectric's electric properties, the period of stabilization at any given temperature is somewhat limited and for long life at moderately elevated temperatures results are not satisfactory. When larger amounts of inhibitors are employed the insulation resistance, power factor, dielectric constant and/or melting point may be affected to an extent sufficient to prohibit the use of the composition in high quality capacitors.

It is an object of the invention to overcome the foregoing and related disadvantages. A further object is to produce new and useful dielectric compositions. A still further object is to produce new and useful electrical capacitors which may be operated at elevated temperatures and extended periods without failure. Additional objects will become apparent from the following description and claims.

These objects are attained in accordance with the present invention wherein there is produced a dielectric composition comprising a dielectric material selected from the class consisting of aliphatic and aromatic hydrocarbons and halogenated derivatives thereof in which is dissolved from about 0.1 percent to about 5 percent of azobiphenyl or a substituted derivative thereof.

In a more restricted sense the invention is concerned with a dielectric composition comprising chlorinated naphthalene containing from about .1 percent to about 5 percent azobiphenyl.

The invention is also concerned with electrical capacitors comprising aluminum electrode foils separated by a porous dielectric spacing material impregnated with one of the dielectric compositions of this invention.

This invention is based upon the discovery that azobiphenyl and substituted derivatives thereof, particularly alkyl derivatives thereof, are exceptionally effective inhibitors for the decomposition of a number of dielectric materials including chlorinated naphthalene and biphenyl, synthetic polymers of the isobutylene type, and mineral oil compounds.

One particular advantage of our dielectric compositions is that the insulation resistance at normal and at elevated temperatures is much higher than is found with known inhibitors such as azobenzene; the latter is severely limited in use because it lowers even the room temperature leakage resistance to a marked degree. A further advantage resides in the fact that the intense color of the azobiphenyl compounds permits ready analytical determination of their concentration at any time.

While azobiphenyl itself is an outstanding material for use in accordance with this invention it is also possible to use substituted derivatives thereof in which the benzene nuclei are substituted with alkyl, aralkyl, nitro or other groups selected to modify its solubility characteristics, melting point, etc.

The dielectric materials which may be stabilized in accordance with the present invention include, as noted above, chlorinated naphthalene, chlorinated biphenyl and various hydrocarbon mineral oils and synthetic polymers. Vegetable oils, such as castor oil, may also be treated. The reaction is not limited to liquid systems since chlorinated naphthalene wax is effectively stabilized throughout its normal operating range, e. g., up to +85° C., despite the fact that its melting point is in excess of this value.

The amount of inhibitors employed is ordinarily from about .1 percent to about 5.0 percent by weight of the dielectric material to be treated. Percentages on the order of 2 to 3 percent are normally employed where optimum electrical properties are desired throughout an extended operating life.

As an illustrative example of the unusual stabilizing characteristics of the compounds of the invention, two sets of capacitors were rolled with aluminum foil separated by a calendered kraft paper spacing totaling .0009" in thickness. Half of the capacitors were impregnated with chlorinated naphthalene wax to a capacity of approximately .1 mf. and in this construction the normal rating was 400 v. D. C. The other set of capacitors was impregnated with chlorinated naphthalene containing 3 percent by weight of azobiphenyl.

The two sets of capacitors were life tested according to standard practice at 600 v. D. C. in an ambient temperature of 85° C. At the end of 250 hours, five of 12 standard units had failed and by the end of 500 hours, 11 of 12 units had failed. In sharp contrast to this, all 12 of the special capacitors showed no failures at all through over 1500 hours. At 1792 hours one of the 12 special capacitors failed but the balance was still functioning at 2000 hours.

As a matter of interest the initial insulation resistance of the special capacitors averaged over 5000 megohm-microfarads at room temperature, well over the 2000 megohm-microfarads requirement normally specified for chlorinated naphthalene capacitors. Even at the end of 1000 hours at 85° C., the average room temperature insulation resistance was in excess of 3000 megohm-microfarads.

The use of azobiphenyl is not restricted to temperatures of 85° C. as, for example, polyisobutylene with an average molecular weight of about 3000 may be utilized as a paper capacitor impregnant for service at 125 to 150° C., provided that 2 to 5 percent azobiphenyl is employed as an inhibitor. Mineral oil is likewise made suitable for high temperature capacitors when provided with the inhibitors of the invention. As previously pointed out any solubility problems may be eliminated by appropriate substitution of one or more benzene nuclei of the azobiphenyl.

The preferred combination of the invention, namely the use of azobiphenyl with chlorinated naphthalene wax is characterized by extreme life under electrical load, very high insulation resistance and ease of manufacturing use and control.

As many apparently widely different embodiments of this invention may be made without departing from the spirit and scope hereof, it is to be understood that the invention is not limited to the specific embodiments hereof except as defined in the appended claims.

What is claimed is:

1. A dielectric composition consisting essentially of chlorinated naphthalene containing from about .1 percent to about 5 percent azobiphenyl.

2. A dielectric composition consisting essentially of a ring chlorinated aromatic hydrocarbon containing from about .1% to about 5% azobiphenyl.

References Cited in the file of this patent

UNITED STATES PATENTS 2,077,429    McMahon _____ Apr. 20, 1937

OTHER REFERENCES

I and E Chemistry, January 1952, vol. 44, No. 1, pages 135–140.